United States Patent [19]
Rice

[11] Patent Number: 5,884,880
[45] Date of Patent: Mar. 23, 1999

[54] FLEX ARM LINKAGE ASSEMBLY

[75] Inventor: Bradley A. Rice, Sherwood, Oreg.

[73] Assignee: DCI International, Newberg, Oreg.

[21] Appl. No.: 888,764

[22] Filed: Jul. 7, 1997

[51] Int. Cl.[6] .................................................. E04G 3/00
[52] U.S. Cl. ................................ 248/279.1; 248/280.11
[58] Field of Search ........................... 298/279.1, 284.1, 298/278.1, 280.11, 281.11, 298, 276.1; 433/33, 77, 79

[56] References Cited

U.S. PATENT DOCUMENTS

| | | | |
|---|---|---|---|
| 4,082,244 | 4/1978 | Groff | 248/280.11 |
| 4,160,536 | 7/1979 | Krogsrud | 248/280.11 |
| 5,340,072 | 8/1994 | Halbirt | 248/279.1 |

*Primary Examiner*—Ramon O. Ramirez
*Attorney, Agent, or Firm*—Trask, Britt & Rossa

[57] ABSTRACT

A mechanical arm assembly includes an elongated housing member, having internal channels extending between its respective ends. A rod member is mounted within one of those channels, and the housing and rod member are pivotally connected at respective opposite ends to a fixed pivot post and a traveling pivot post to effect a four bar linkage arrangement. A floating spring is mounted within another internal channel separate from and approximately parallel the rod. The spring is mounted to resist the force of gravity operating upon the traveling pivot post, and is linked to that post through a fluid actuated brake cartridge slidably mounted within the channel housing the spring.

30 Claims, 2 Drawing Sheets

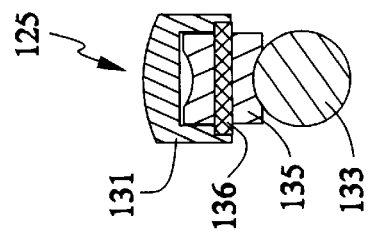
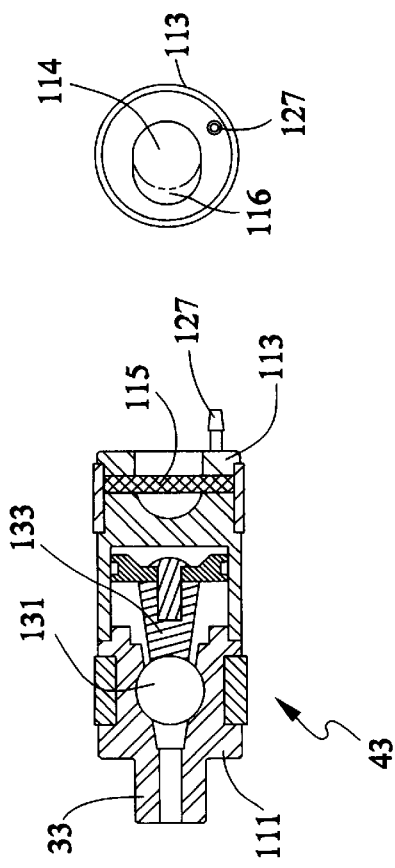
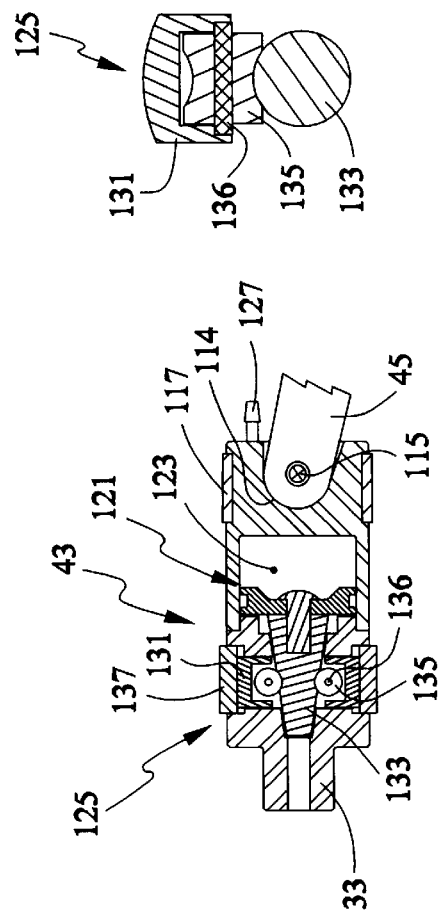
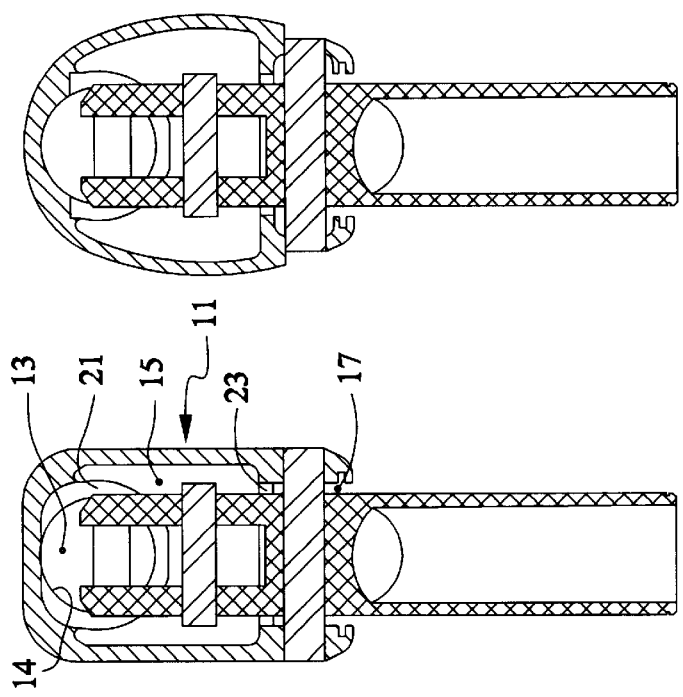

FLEX ARM LINKAGE ASSEMBLY

BACKGROUND OF THE INVENTION

1. Field of the Invention

This invention is directed to the linkage systems of mechanical arms. It is particularly directed to a four bar linkage assembly. It provides such an assembly especially adapted for use in a dental unit flex arm.

2. State of the Art

Mechanical support arms utilizing four bar linkage assemblies are utilized in a variety of settings. Such arms are typically used to support loads at adjustable locations. In a dental operatory, for example, dental instruments and fixtures may be supported by a mechanical, or "flex," arm within reach of a dentist. The arm typically includes a brake mechanism for locking the load in a selected position. When the brake is released, the load-bearing end of the arm may be raised or lowered as desired. The load-bearing end typically supports a "head" fixture which maintains a selected "level" attitude with respect to vertical and horizontal reference planes. "Horizontal," in this context, refers to approximately parallel the surface of the earth.

In a typical arrangement, an elongated arm member is pivotally fastened at a first end to an end post. The end post may be fixed or movable, but in any case comprises an anchor for the mechanical arm. A second end of the arm is pivotally fastened to a support post, which comprises a connection mechanism for a positionable load. The pivot axis of the arm member at the end post is ordinarily horizontally disposed so that the load-bearing end can be moved up or down vertically. A mechanism may also be provided to permit the arm to pivot around a vertical axis at the end post. The pivot axis of the arm member at the support post is also typically approximately horizontally disposed. The head fixture is typically connected through a mechanism proving for pivoting around an approximately vertical axis at the support post.

U.S. Pat. No. 5,340,072, the disclosure of which is incorporated by reference as a part of this disclosure, illustrates a four bar linkage system of the type described. A rod is pivotally connected to both the end post and the support post. The rod and arm are pinned to the posts in generally parallel orientation. A tray is mounted to the support post to be rotatable about a vertical axis. The parallel linkage assembly comprised of the arm, the rod and the two posts functions to maintain the orientation of the support post relative to vertical as the arm is pivoted up and down at the end post. A spring is positioned about the rod, and reacts between the rod and the end post to counter the weight of the arm system. The spring thus prevents the load end of the arm from falling under its own weight when the brake is released. The resistance of the spring is adjustable, but with considerable inconvenience. The effective length of the rod is adjustable to compensate for sag of the arm resulting from wear or heavy loads.

Currently available dental operatory flex arms are mechanically complex, and are relatively costly to manufacture. They are difficult to disassemble in the field for maintenance. It is generally impractical for a clinician to effect adjustments of spring tension and leveling (at the support post). Disassembly is hazardous because of the lack of suitable means for relieving stored spring energy. There remains a need for an improved mechanical arm assembly for use in dental operatories and other environments.

SUMMARY OF THE INVENTION

This invention provides an improved mechanical arm, specifically, an improved four bar linkage assembly for flex arms. The assembly is relatively simple in construction, and provides several advantages over current designs. The entire assembly may be disassembled in the field for maintenance. Spring energy is easily released without disassembly. Accordingly, disassembly can be effected without concern about the safety issues associated with the opportunistic release of spring energy.

The mechanical arm of this invention may be viewed as an improvement to arms which are conventionally constructed to incorporate a four bar linkage arrangement including external and internal horizonal members pivotally connected at respective first ends to a fixed pivot post and at respective second ends to a traveling pivot post, with a spring arranged to resist the force of gravity operating on the traveling pivot post. The improvement has several aspects, notably providing the spring separate from and in approximately parallel arrangement with respect to the internal horizontal member. A mechanical arm assembly may, for example, include an elongated housing member, having internal channels extending between its respective ends. A rod member may be mounted within one of those channels, and the housing and rod member are then pivotally connected at respective opposite ends to a fixed pivot post and a traveling pivot post to effect a four bar linkage arrangement. A floating spring may be mounted within another internal channel separate from and approximately parallel the rod. The spring is mounted to resist the force of gravity operating upon the traveling pivot post, and may be linked to that post through a fluid actuated brake cartridge slidably mounted within the channel housing the spring.

The four bar linkage portion of the assembly includes two long horizontal members; a housing and a rod mounted within and approximately parallel the housing. The housing constitutes a significant advance, in that it provides a low cost platform for assembling the other components of the system. Moreover, the assembly utilizes a "floating," or encased, spring. The spring is mounted separate from the four bar linkage rod in a fashion which permits convenient occasional adjustment, including the complete release of stored spring energy prior to disassembly. The core of the spring is open, rather than being occupied by a structural member. Ideally, the spring is mounted to operate within a self-lubricating tube. The encased spring is mounted within a channel extending the full length of the housing, and reacts between a fixed end and a brake cartridge reciprocally mounted within the channel.

The four bar linkage arrangement further includes a pair of posts, comparable to those of previous arrangements, but with one of those posts connected in novel fashion through a link to the floating spring assembly. This connection provides for the constant application of spring pressure against a pin connecting the rod member to one of the posts. That pin resides in an elongate hole through the rod, thereby providing for head leveling adjustments. These head leveling adjustments are conveniently accomplishable as needed without the need for skilled intervention.

The entire linkage is assembled by means of transverse pins and associated bushings, washers and clips. Accordingly, it can be assembled and disassembled with few and simple hand tools.

A typical mechanical arm assembly of this invention thus comprises an elongated housing member, having an upper end, a lower end and first and second internal channels extending between the upper and lower ends. A first post member is pivotally connected to the housing at its upper end. A second post member is pivotally connected to the housing at its lower end. A rod member is mounted within the second internal channel. It has a first end pivotally connected to the first post member, and a second end pivotally connected to the second post member, whereby to define, with the first and second post members and the housing, a four bar linkage arrangement. A floating spring is mounted within the first internal channel, and has a first end juxtaposed against a plug at the upper end of the housing and a second end pressed against linkage pivotally connected to the second post.

In preferred arrangements, the floating spring is included within an assembly comprising, the plug, carrying external threads engaged by complementary internal threads carried by the first internal channel; the spring, mounted within a tube, the tube being positioned within the first internal channel, and the linkage. Typical linkage systems include a brake cartridge mounted reciprocally within the first internal channel, and a push rod, having a first end pivotally connected to the brake cartridge and a second end pivotally connected to the second post. The brake cartridge is typically fluid (usually air) actuated, and includes brake structure constructed and arranged to engage the inner surface of the first channel in response to the application of fluid pressure to a fluid inlet communicating with the cartridge.

The plug may be structured with a first end oriented towards the upper end of the housing, the first end being configured to accept a tool adapted to turn the plug into and out of the first channel and a second end carrying structure adapted to engage the first end of the spring. The plug is generally oriented to be accessible through the upper end of the housing, and the upper end of the housing is then provided with a removable end cap element. The second end of the plug is configured as a needle bearing, including a needle structure shaped and dimensioned to enter the core of the spring.

A feature of other preferred embodiments is that the rod member is connected to the second post member by means of an adjustment mechanism structured and arranged selectively to provide for changing the orientation with respect to vertical of the second post member. The second end of the rod member may, for example, extend through a passageway defined by approximately parallel plate structures integral with the second post. In those instances, the adjustment mechanism includes a transverse pin positioned through the plate structures and extending through a slot in the second end of the rod member and an adjustment rod mounted selectively to advance and retract within the slot in contact with the transverse pin and extending through the second end of the rod member. The adjustment rod ideally carries external threads mated with corresponding internal threads of a bore through the second end of the rod member. The adjustment mechanism may be mounted to be accessible through the lower end of the housing, and the lower end of the housing may then be provided with a removable end cap.

A highly preferred mechanical arm assembly of this invention comprises an elongated housing member, having an upper end, a lower end and first, second and third internal channels extending between said upper and lower ends. The first and second channels may be organized substantially as previously described. Utility lines may be fed through passageways provided in the first post, extended through the third internal channel, the third internal channel being closed by a removable cover, and down through passageways provided in the second post to supply air, water, and other utilities to the load, typically a dental delivery system, supported by the second post.

BRIEF DESCRIPTION OF THE DRAWINGS

In the drawings, which illustrate what is currently regarded as the best mode for carrying out the invention:

FIG. 2 is a partial view in section, taken along the line 2—2 of FIG. 1, looking in the direction of the arrows;

FIG. 3 is a view similar to FIG. 2 of an alternative embodiment;

FIG. 4 is a view in elevation of a brake cartridge element shown in FIG. 1, but drawn to an enlarged scale;

FIG. 5 is a view similar to FIG. 4, rotated approximately 90° to reveal additional internal components;

FIG. 6 is an end view in elevation of the cartridge of FIGS. 4 and 5;

FIG. 7 is a pictorial view of a roller bearing element and brake actuator of the cartridges of FIGS. 4 and 5; and FIG. 8 is a fragmentary view of a linkage element of FIG. 1.

DETAILED DESCRIPTION OF THE ILLUSTRATED EMBODIMENT

Figure 1:
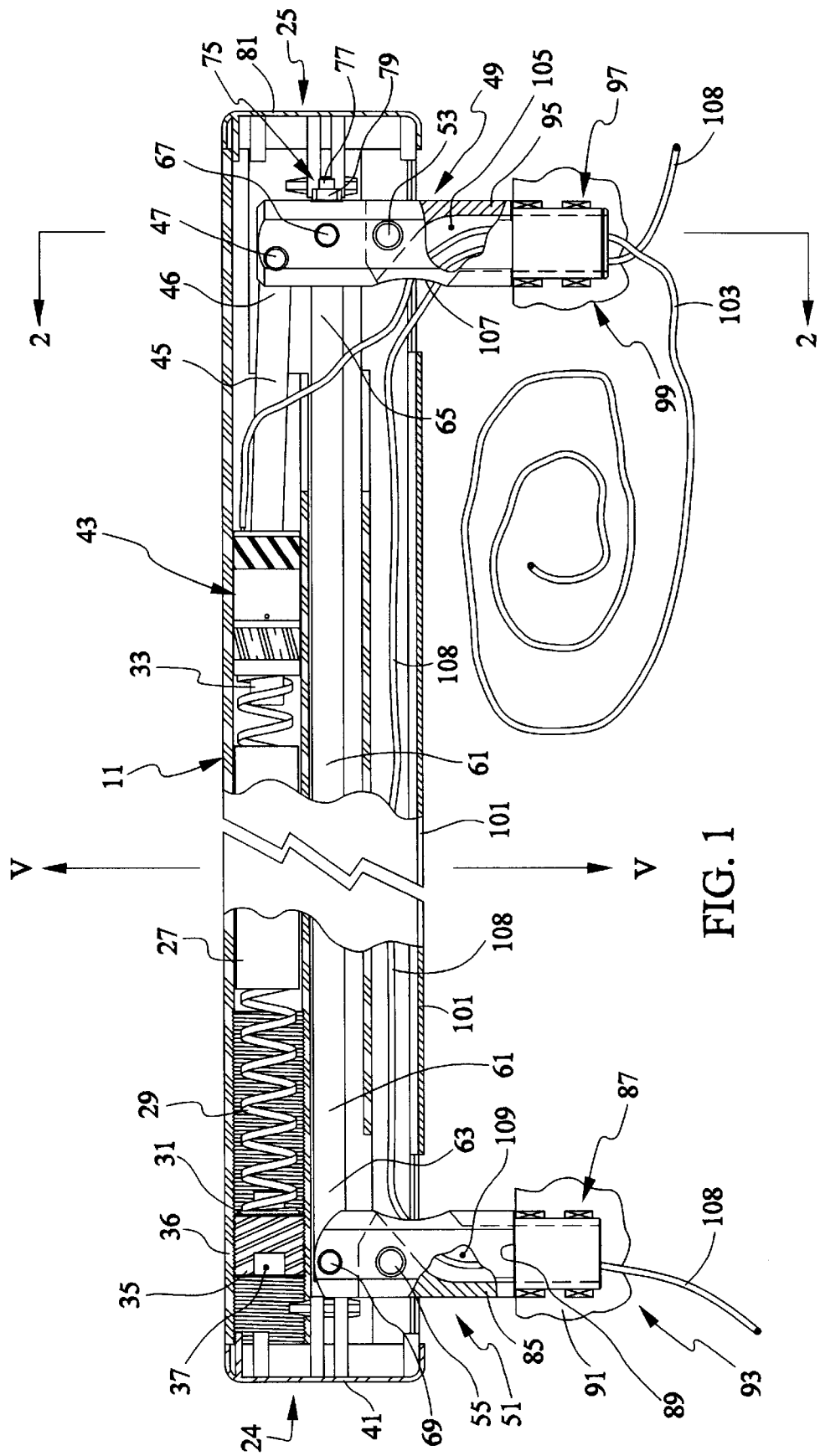
FIG. 1 is an assembly view in elevation, partially in section and partially broken away, illustrating a practical embodiment of the invention.

As best shown by FIGS. 1 and 2, a rigid housing, generally 11, is internally configured to include first 13, second 15 and third 17 channels, respectively. These channels are defined in part by internal webbing structures, 21, 23, which contribute rigidity and strength to the extrusion 11. While the housing may be fabricated from various materials and by various methods, the currently preferred embodiments comprise sections cut from an aluminum extrusion. For purposes of orientation, the housing 11 may be considered to have an upper end, generally 24, and a lower end, generally 25.

As illustrated, the first channel 13 is configured approximately as an open circular cylinder defined by an inner surface 14. It contains a cylindrical tubular spring guide 27, preferably formed from plastic having self lubricating properties. A coil spring 29 is loosely contained within the spring guide 27, being compressed between a needle thrust bearing element 31 and a spring mounting pilot element 33. The degree of compression applied to the spring is adjusted by turning a threaded adjusting plug or nut 35 into or out of the upper end 36 of the channel 13. As shown, the plug or nut 35 is integral with the thrust bearing element 31, and is provided with a socket 37 to facilitate rotation by means of a conventional socket driver (not shown). With the spring tension appropriately adjusted, the upper end 24 of the extrusion 11 may be closed off with an upper end cap 41.

The spring 29 constantly urges a brake cartridge, generally 43, and its associated spring push rod 45, towards the lower end 25 of the extrusion 11. In FIG. 1, pilot element 33, brake cartridge 43, and spring push rod 45 collectively form a linkage element. The lower end 46 of the push rod 45 is linked, by means of a transverse pin 47 connection to a lower (support or fixed) pivot post, generally 49. This post 49 and a corresponding upper traveling pivot post, 51, are pivotally connected, by transverse pins 53, 55, respectively, to the extrusion 11, all as shown by FIG. 1. A parallelogram linkage rod 61, contained within the second channel 15, is also pivotally linked at its opposite ends, 63, 65, by transverse pins 67, 69, respectively, to the lower and upper pivot posts, 49, 51, respectively. The extrusion 11, the two pivot posts, 49, 51, and the linkage rod 61 thus comprise a four bar linkage arrangement. In the orientation shown in FIG. 1, extrusion 11 and linkage rod 61 comprise external and internal horizontal members, respectively.

The pins 67, 69 pass through holes 71, 73 in the link rod 61 (See FIG. 8). The hole 71 is oversized to provide for a leveling adjustment at the lower pivot post 49. A unit head adjustment assembly, generally 75, comprises a threaded rod 77 and lock nut 79. The rod 77 may selectively be turned clockwise or counterclockwise against the pin 67, thereby adjusting the attitude of the pivot post 49 with respect to vertical axis V—V. The adjustment assembly 75 is accessible through a removable lower end cap 81.

The depending end 85 of the upper pivot post 51 terminates in bearing structure, generally 87, seated in a socket 89 at the upper end 91 of a mounting structure, generally 93, (only partially shown.) The depending end 95 of the lower pivot post 49 similarly terminates in bearing structure, generally 97, adapted to couple with a head structure, generally 99, (partially shown) A load, such as a dental delivery system, (not shown) is supportable by the head structure 99. The bearing structures 87, 97 provide for pivoting movement about respective, approximately vertical axes.

The third channel 17 functions as a conduit for any plumbing and wiring required by the load. This channel 17 is closed off by a suitable cover, such as the plastic strip 101 shown. A flexible tubing 103 extends up through the hollow center 105 of the post 49 and out an opening 107, through the channels 17, 15, 13 to supply air or other pneumatic or hydraulic fluid to the brake cartridge 43. For purposes of illustration, a single utility conduit 108 is shown extending up the hollow interior 109 of pivot post 51, through the channel 17 and down the hollow interior 105 of pivot post 49. It should be understood that a multiplicity of conduits and/or wires can be similarly situated to meet the requirements of a particular installation. A typical dental delivery unit will require at least air, suction and water lines, for example.

As best shown by FIGS. 4 and 5, the brake cartridge 43 includes a first housing 111, which carries the spring mounting pilot 33, and a second housing 113, which carries the spring push rod 45. A rounded end 114 of the rod 45 is connected by a transverse pin 115 within a socket 116 (FIG. 6) integral with the second housing 113. A plastic guide bearing 117, retains the pin 115 and interfaces between the second housing 113 and the interior surface 14 of the internal channel 13 (FIG. 2). A piston and seal assembly, generally 121, is reciprocally mounted within a chamber 123 defined by the housings 111, 113, and is actuated, (that is, advanced with respect to a brake actuation assembly, generally 125,) by the application of pressurized air through an air pressure barb 127. A plurality of brake actuator elements 131 are mounted in position for engagement by an actuation cone 133 carried by the piston assembly 121. The cone 133 rides on rollers 135 (FIGS. 4 and 7). Axle 136 of roller 135 displaces brake actuators 131 laterally. The extent of this displacement is governed by the position of the cone 133 (Compare FIGS. 4 and 5). When air pressure is applied, the cone 133 advances between the actuators 131, thereby urging expanding brake shoes 137 out into engagement with the interior surface 14 of the first channel 13. Release of the air pressure permits the cone actuator 131 and rollers 135 to move down the ramped surface of the cone 133, thereby to relieve the frictional contact of the shoes 137 with the surface 14 (FIG. 5).

Reference in this disclosure to specific details of the illustrated or preferred embodiments is not intended to limit the scope of the appended claims, which themselves recite those details regarded as important to the invention.

What is claimed is:

1. A mechanical arm assembly, comprising:
    an elongated housing member, having an upper end, a lower end and first and second internal channels extending between said upper and lower ends;
    a first post member, pivotally connected to said housing at said upper end;
    a second post member, pivotally connected to said housing at said lower end;
    a rod member, mounted within said second internal channel, said rod member having a first end pivotally connected to said first post member, and a second end pivotally connected to said second post member, whereby to define, with said first and second post members and said housing, a four bar linkage arrangement; and
    a floating spring mounted within said first internal channel said spring having a first end juxtaposed against a plug at said upper end of said housing and a second end pressed against a linkage element pivotally connected to said second post.

2. A mechanical arm according to claim 1, wherein said floating spring is included within an assembly comprising:
    said plug, carrying external threads engaged by complementary internal threads carried by said first internal channel;
    said spring, mounted within a tube, said tube being positioned within said first internal channel; and
    said linkage element, including
        a brake cartridge mounted reciprocally within said first internal channel, and
        a push rod, having a first end pivotally connected to said brake cartridge and a second end pivotally connected to said second post.

3. A mechanical arm according to claim 2, wherein said plug has:
    a first end oriented towards said upper end of said housing, said first end being configured to accept a tool adapted to turn said plug into and out of said first channel; and
    a second end carrying structure adapted to engage said first end of said spring.

4. A mechanical arm according to claim 2, wherein said brake cartridge is fluid actuated and includes brake structure constructed and arranged to engage the inner surface of said first channel in response to the application of fluid pressure to a fluid inlet communicating with said cartridge.

5. A mechanical arm according to claim 4, wherein said plug has:
    a first end oriented towards said upper end of said housing, said first end being configured to accept a tool adapted to turn said plug into and out of said first channel; and
    a second end carrying structure adapted to engage said first end of said spring.

6. A mechanical arm according to claim 2, wherein said plug is oriented to be accessible through said upper end of said housing, and said upper end of said housing is provided with a removable end cap element.

7. A mechanical arm according to claim 6, wherein said plug has a first end oriented towards said upper end of said housing, said first end being configured to accept a tool adapted to turn said plug into and out of said first channel.

8. A mechanical arm according to claim 6, wherein said first end is provided with a socket configured to accept the drive post of a socket drive tool.

9. A mechanical arm according to claim 6, wherein said plug has a second end carrying structure adapted to engage said first end of said spring.

10. A mechanical arm according to claim 9, wherein said second end of said plug is configured as a needle beating, including a needle structure shaped and dimensioned to enter the core of said spring.

11. A mechanical arm according to claim 1, wherein said rod member is connected to said second post member by means of an adjustment mechanism structured and arranged selectively to provide for changing the orientation with respect to vertical of said second post member.

12. A mechanical arm according to claim 11, wherein said second end of said rod member extends through a passageway defined by approximately parallel plate structures integral with said second post; and said adjustment mechanism includes:
   a transverse pin through said plate structures and extending through a slot in said second end of said rod member; and
   an adjustment rod mounted selectively to advance and retract within said slot in contact with said transverse pin and extending through said second end of said rod member.

13. A mechanical arm according to claim 12, wherein said adjustment rod carries external threads mated with corresponding internal threads of a bore through said second end of said rod member.

14. A mechanical arm according to 12, wherein said adjustment mechanism is mounted to be accessible through said lower end of said housing, and said lower end of said housing is provided with a removable end cap.

15. A mechanical arm according to claim 14, wherein said floating spring is included within an assembly comprising:
   said plug, carrying external threads engaged by complementary internal threads carried by said first internal channel;
   said spring, mounted within a tube, said tube being positioned within said first internal channel; and
   said linkage element, including
      a brake cartridge mounted reciprocally within said first internal channel, and
      a push rod, having a first end pivotally connected to said brake cartridge and a second end pivotally connected to said second post.

16. A mechanical arm according to claim 15, wherein said plug has:
   a first end oriented towards said upper end of said housing, said first end being configured to accept a tool adapted to turn said plug into and out of said first channel; and
   a second end carrying structure adapted to engage said first end of said spring.

17. A mechanical arm according to claim 15, wherein said brake cartridge is fluid actuated and includes brake structure constructed and arranged to engage the inner surface of said first channel in response to the application of fluid pressure to a fluid inlet communicating with said cartridge.

18. A mechanical arm according to claim 17, wherein said plug has:
   a first end oriented towards said upper end of said housing, said first end being configured to accept a tool adapted to turn said plug into and out of said first channel; and
   a second end carrying structure adapted to engage said first end of said spring.

19. A mechanical arm according to claim 15, wherein said plug is oriented to be accessible through said upper end of said housing, and said upper end of said housing is provided with a removable end cap element.

20. A mechanical arm according to claim 19, wherein said plug has a first end oriented towards said upper end of said housing, said first end being configured to accept a tool adapted to turn said plug into and out of said first channel.

21. A mechanical arm according to claim 19, wherein said first end is provided with a socket configured to accept the drive post of a socket drive tool.

22. A mechanical arm according to claim 19, wherein said plug has a second end carrying structure adapted to engage said first end of said spring.

23. A mechanical arm according to claim 22, wherein said second end of said plug is configured as a needle bearing, including a needle structure shaped and dimensioned to enter the core of said spring.

24. A mechanical arm assembly, comprising:
   an elongated housing member, having an upper end, a lower end and first, second and third internal channels extending between said upper and lower ends;
   a first post member, pivotally connected to said housing at said upper end;
   a second post member, pivotally connected to said housing at said lower end;
   a rod member, mounted within said second internal channel, said rod member having a first end pivotally connected to said first post member, and a second end pivotally connected to said second post member, whereby to define, with said first and second post members and said housing, a four bar linkage arrangement;
   a floating spring mounted within said first internal channel said spring having a first end juxtaposed against a plug at said upper end of said housing and a second end pressed against a linkage element pivotally connected to said second post; and
   utility lines extending through said third internal channel, said third internal channel being closed by a removable cover.

25. In a mechanical arm constructed to incorporate a four bar linkage arrangement including external and internal horizontal members pivotally connected at respective first ends to a fixed pivot post and at respective second ends to a traveling pivot post, with a spring arranged to resist the force of gravity operating on said traveling pivot post, the improvement comprising:
   providing said spring separate from and in approximately parallel arrangement with respect to said internal horizontal member, said internal horizontal member being located external to said spring.

26. An improvement according to claim 25, wherein said spring is mounted within an approximately cylindrical channel through said external horizontal member and is linked to said traveling pivot post through a brake assembly mounted to slide within said channel.

27. In a mechanical arm constructed to incorporate a four bar linkage arrangement including external and internal horizontal members pizotally connected at respective first ends to a fixed pivot post and at respective second ends to a traveling pivot post, with a spring arranged to resist the force of gravity opeerating on said traveling puvot post, the improvement comprising:
   providing said spring separate from and in approximately parallel arrangement with respect to said internal horizontal member;
   wherein said spring is mounted within an approximately cylindrical channel through said external horizontal member and is linked to said traveling pivot post through a brake assembly mounted to slide within said channel; and wherein said spring includes a first end juxtaposed against a plug at a first end of said channel and a second end pressed against a linkage element pivotally connected to said traveling post.

28. An improvement according to claim 27, wherein said spring is included within an assembly comprising:
   said plug, carrying external threads engaged by complementary internal threads carried by said channel;
   said spring, mounted within a tube, said tube being positioned within said channel; and
   said linkage element, including
      a brake cartridge mounted reciprocally within said channel, and
      a push rod, having a first end pivotally connected to said brake cartridge and a second end pivotally connected to said traveling post.

29. An improvement according to claim 28, wherein said plug has:
   a first end oriented towards said first end of said channel said first end of said plug being configured to accept a tool adapted to turn said plug into and out of said channel; and
   a second end carrying structure adapted to engage said first end of said spring.

30. An improvement according to claim 28, wherein said brake cartridge is fluid actuated and includes brake structure constructed and arranged to engage the inner surface of said channel in response to the application of fluid pressure to a fluid inlet communicating with said cartridge.

* * * * *

UNITED STATES PATENT AND TRADEMARK OFFICE
CERTIFICATE OF CORRECTION

PATENT NO : 5,884,880
DATED : March 23, 1999
INVENTOR(S) : Rice

It is certified that error appears in the above-identified patent and that said Letters Patent are hereby corrected as shown below:

On the title page:
Item [21], change "888,764" to --08/888,764--.

In the specification:

| | | |
|---|---|---|
| Column 1, | line 35, | change "proving" to --providing--; |
| Column 3, | line 12, | after "comprising" change "," to --:--; |
| Column 3, | line 16, | after "channel" change "," to --;--; and |
| Column 5, | line 57, | change "cone actuator" to --brake actuator elements--. |

In the claims:

| | | | |
|---|---|---|---|
| Claim 1, | Column 6, | line 12, | after "channel" insert --,--; |
| Claim 8, | Column 6, | line 60, | change "the" to --a--; |
| Claim 10, | Column 6, | line 66, | change "beating," to --bearing,--; |
| Claim 14, | Column 7, | line 24, | after "to" insert --claim--; |
| Claim 21, | Column 8, | line 4, | change "the" to --a--; |
| Claim 24, | Column 8, | line 28, | after "channel" insert --,--; |
| Claim 27, | Column 8, | line 54, | change "pizotally" to --pivotally--; |
| Claim 27, | Column 8, | line 57, | change "opeerating" to --operating--; and change "puvot" to --pivot--; |
| Claim 28, | Column 9, | line 13, | after "channel" change "," to --;--; and |
| Claim 29, | Column 10, | line 3, | after "channel" insert --,--. |

Signed and Sealed this

Eighth Day of May, 2001

*Attest:*

NICHOLAS P. GODICI

*Attesting Officer*    Acting Director of the United States Patent and Trademark Office